3,403,314
CONDITION RESPONSIVE MOTOR CONTROL HAVING UNIJUNCTION FIRING CIRCUIT FOR A TRIGGERED SWITCH
John T. Maynard, New Berlin, Wis., assignor to A. O. Smith Corporation, Milwaukee, Wis., a corporation of New York
Filed Oct. 22, 1965, Ser. No. 500,966
6 Claims. (Cl. 318—227)

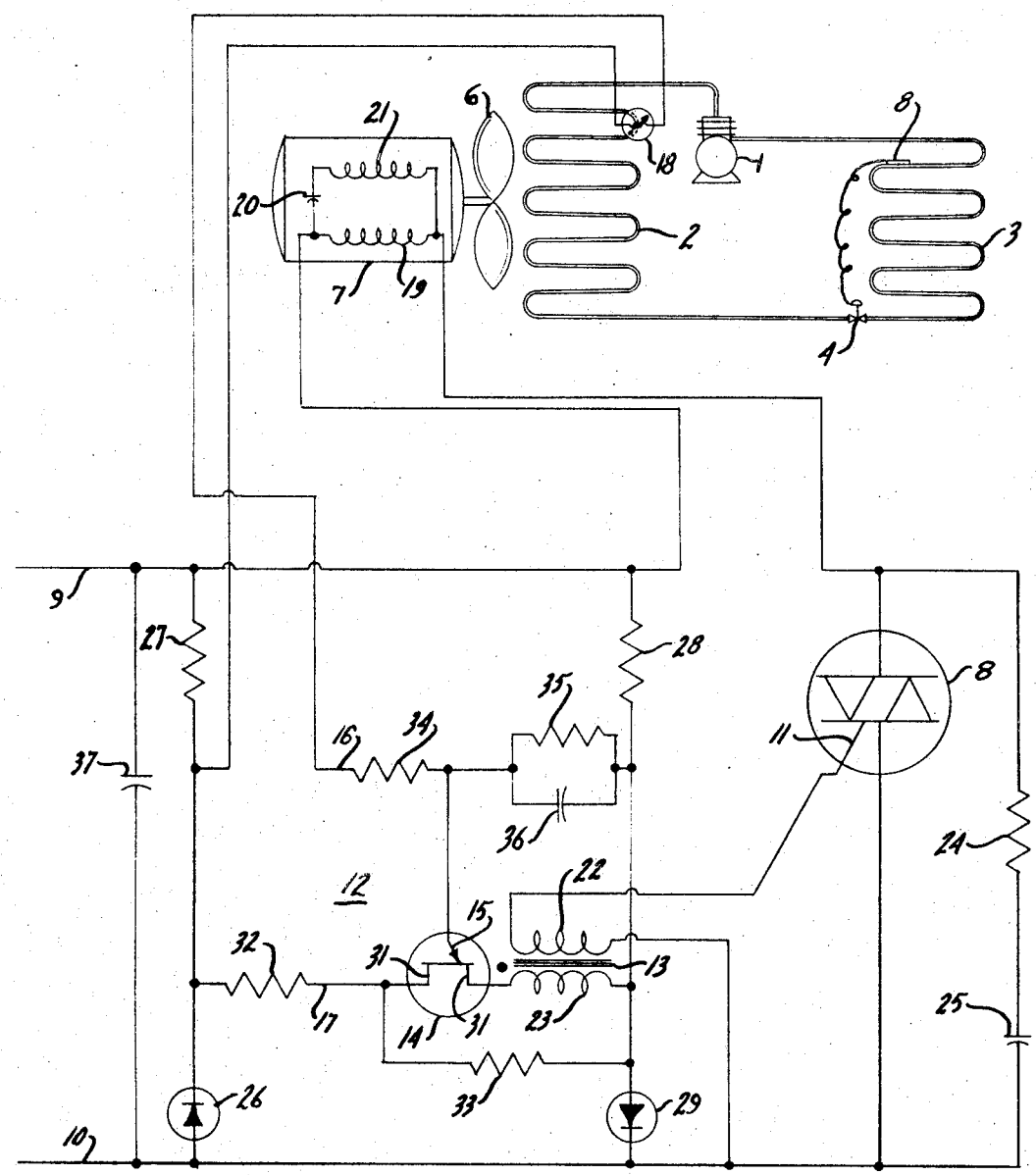
INVENTOR
JOHN T. MAYNARD
BY
Merl E. Sceales
Attorneys

United States Patent Office 3,403,314
Patented Sept. 24, 1968

ABSTRACT OF THE DISCLOSURE

A split capacitor motor is connected to a power supply in series with a "Triac" or other bidirectional solid state gated switch. A capacitor firing circuit is connected to the incoming power line and connected to fire the switch. A unijunction firing circuit includes a thermistor in series with a capacitor to vary the time a positive pulse is applied to the gate of the unijunction transistor in accordance with the sensed temperature. The firing circuit is connected across the incoming power lines through a rectifying bridge circuit such that the unijunction transistor and the series thermistor and capacitor are parallel connected and energized with a pulsating direct current corresponding in frequency and phase to the incoming alternating current power. The unijunction transistor 14 includes a pair of base electrodes, one of which is connected in the circuit in series with a resistor and the opposite of which is is connected in series with the primary of the pulsating transformer connected to the "Triac." A resistor is connected in series with the resistor and in parallel with the interbase circuit of unijunction transistor in series with the primary of the pulsing transformer.

---

This invention relates to a condition responsive motor control and particularly to a temperature responsive motor control for refrigeration motors and the like.

In air conditioning and refrigeration control systems, it is desirable to vary the speed of an alternating current motor driving an air fan for various reasons. In applicant's copending application entitled, Dynamoelectric Machine and Control Therefore, filed on Jan. 29, 1965, with Ser. No. 428,975 and assigned to the same assignee as this application, a small split capacitor motor for controlling the air output of a hot air furnace system or heating system is disclosed. As disclosed in that application, a capacitor firing circuit is connected to the incoming power line and connected to fire a triggered symmetrical rectifier or switch which can be fired to conduct during both the positive half cycle and the negative half cycle of an alternating current input by an appropriate firing signal applied to one gate. The phase or time of the firing controls the voltage applied to the motor and thereby the speed of the motor. A thermistor is connected in a triggering circuit for the symmetrical switch to control the speed of the motor in accordance with a sensed temperature; for example, the bonnet temperature of a hot air furnace.

United States Patent 3,196,629 discloses a refrigeration system employing an air cooled condenser. The speed of the fan motor is varied to control the air flow in accordance with the condenser temperature. A unijunction firing circuit includes a temperature sensitive means to vary the time positive of a firing pulse in accordance with the sensed temperature. The circuit is connected to control firing of a silicon controlled rectifier which in turn controls the voltage application to an alternating current motor to vary the speed of the fan motor and thereby control the air passed over a condenser. In the aforementioned U.S. patent, the current through an electric motor is varied to maintain a desired minimum condensing temperature.

In applications where the control is to be mounted as an integrated part of the motor as shown in applicant's previously identified copending application and in an air cooled condenser unit, the control circuit must be specially designed to operate in response to widely varying temperature conditions. Further, it is highly important that the firing circuit provide symmetrical firing of the switch on the opposite polarity half cycles of the alternating current signal in order to minimize or avoid creation of a direct current component in the motor circuit. A direct current component produces high losses, negative torque and noise in an alternating current motor. As a practical matter for commercial production, the circuit is preferably adapted to provide control over various desired temperature ranges; i.e. the variation of the speed for a given variation in temperature will be different in various applications. Speed control between zero and maximum in one application may be desired within a 30° variation in temperature and within a 60 or 70° change in still another application.

The present invention is particularly directed to a temperature and voltage stabilized unijunction transistor firing circuit for symmetrically firing of a triggered switch means connected in a power controlling circuit with an alternating current motor. Generally, in accordance with the present invention, the firing circuit is connected across the incoming power lines through a rectifying bridge circuit such that the unijunction transistor and the firing circuit for the unijunction transistor are connected to be energized with a pulsating direct current corresponding in frequency and phase to the incoming alternating current power. A thermistor is connected in the firing circuit to control the precise firing point in accordance with temperature variation.

In a unijunction transistor, the required firing voltage at the emitter is generally proportional to and follows the varaition in the applied base voltage. The application of the pulsating current to the unijunction base circuit and through the firing circuit to the emitter provides input voltage stabilization. A variation in the incoming line voltage simultaneously varies the voltage applied to both the base circuit and to the emitter circuit. In accordance with a highly important and unusual aspect of the present invention, a resistor is paralleled with the base circuit of the unijunction transistor. This has been found to provide highly stable conditions with variations in temperature while maintaining the tracking feature obtained by applying the full wave pulsing of the alternating current. This has been found to provide a significant improvement in operation over the conventional voltage clamping employing a Zener diode or other clamping means.

The present invention has been found to provide a highly reliable firing circuit for maintaining symmetrical firing of a controlled rectifier device and consequently application of the positive and negative half cycles of the voltages to an alternating current motor in a relatively simple and inexpensive means. Its very simplicity is one of its greatest advantages and improvements in the art of controlling motors.

The drawing furnished herewith illustrates a preferred construction of the present invention in which the above advantages and features are clearly disclosed.

The drawing is a schematic circuit diagram of a control for a split capacitor run motor applied to a refrigeration system of the type employing an air cooled condenser.

Referring to the drawing, the well known refrigeration condenser system is shown including a compressor 1 for producing flow of a suitable refrigerant through an air cooled condenser 2 and a refrigerant evaporator 3. The refrigerant flow through the system is controlled by a suitable thermal expansion valve 4 in the outlet of the exaporator 3 which may be regulated by a suitable temperature sensing device 5 connected to the evaporator. A fan 6 is mounted to pass air over the condenser 2 for condensing the refrigerant therein. The fan 6 includes an alternating current motor 7 which is preferably of the permanent split capacitor variety and consequently the winding for such a motor is diagrammatically shown. With proper design, the speed of a permanent split capacitor motor is directly proportional to the energization voltage supplied to the motor over most of the speed range. Consequently, by varying the portion or period of each positive and negative half cycle of the applied current, the speed of the motor can be accurately controlled. As disclosed in applicant's copending application previously referred to, a triggered symmetrical switch 8 is connected in series with the motor 7 to the incoming power lines 9 and 10. The switch 8 is shown as a bi-directional controlled rectifier having a single gate 11 operative to fire the rectifier to conduct with the voltage applied across the main terminals with either polarity. A firing circuit 12 which particularly forms the subject matter of the present invention is connected to the trigger gate 11 of the switch 8 through a pulse transformer 13.

Generally, the firing circuit includes a unijunction transistor 14 connected to the A.C. power lines 9 and 10 through a rectifying circuit. The unijunction transistor 14 is also a triggered device having a control emitter 15 connected to the power lines through a trigger branch 16 connected in parallel with the base branch 17 of the unijunction transistor which includes the pulse transformer. A temperature sensitive resistance element 18 is connected in the trigger branch 16 and mounted to the condenser coil or the like to provide a variation in the resistance of the trigger circuit in accordance with temperature changes at the condenser 2. In this manner, the precise firing point of the unijunction transistor 14 is controlled and it in turn controls the firing of the symmetrical switch 8 such that for any given temperature, the switch 8 is triggered to conduct for a corresponding period during the positive and the negative half cycles of the incoming alternating current power.

More particularly, in the illustrated embodiment of the invention, the split capacitor motor 7 is shown with the main running winding 19 connected in series with the power lines 9 and 10 and the symmetrical switch 8. The starting capacitor 20 and starting winding 21 are series connected in parallel with the main winding.

The symmetrical switch 8 serves the function of back-to-back silicon controlled rectifiers or the like in that it is adapted to conduct during both the positive half cycle and the negative half cycle of the alternating current power if an input signal or current is applied to the single trigger electrode 11. The pulse transformer 13 has a secondary or output winding 22 connected in circuit to the trigger electrode 11. A primary winding 23 is close coupled to the winding by a suitable core and connected as a part of the unijunction firing circuit. Thus, whenever the unijunction is fired, it passes a current through the primary winding 23 and generates a triggering pulse in the secondary winding 22. Once the symmetrical switch 8 is fired to initiate conduction through the switch, conduction continues for the corresponding half cycle until the current drops to zero and reverses, which allows the symmertical switch 8 to regain its blocking state. Thereafter, the symmetrical switch 8 does not again conduct until another firing pulse is applied to the gate.

A resistor 24 and a capacitor 25 in series are connected directly across the symmetrical switch 8. This network reduces the voltage change with time which may cause false firing of the symmetrical switch. Further, the circuit dissipates the back electromotive force of the permanent split capacitor motor 7 during the interval that the device is blocking or nonconducting to maintain open circuit conditions.

The unijunction firing circuit 12 for the symmetrical switch 8 which particularly forms the subject matter of the subject invention includes a unijunction transistor 14 connected to the incoming power lines through a bridge type circuit, as follows.

A diode 26 in series with a resistor 27 is connected directly across the power lines 9 and 10 and polarized to conduct in one direction; shown from line 10 to 9. A similar resistor 28 is connected in series with a similar diode 29 across the lines with the diode 29 polarized to conduct in the opposite direction.

The unijunction transistor 14 is a conventional well known device and is schematically illustrated including a pair of base electrodes 30 and 31 and the emitter electrode 15. The one base electrode 30 is connected to the junction of the diode 26 and the resistor 27 through a resistor 32. The opposite base electrode 31 is connected in series with the primary 23 of the pulsing transformer 13 to the resistor 28 and the diode 29. During one half cycle, when the one line is positive with respect to the other line, for example, the power circuit through the interbase electrodes is from the line 9 through resistor 27, resistor 32, unijunction transistor 14, the primary 23 and the diode 29 to the opposite power line 10. During the opposite half cycle, the power path is from the power line 10 through the diode 26, the resistor 32, the unijunction transistor 14 and the primary 23 of the pulsing transformer 13, and resistor 28 to the upper power line 9. Thus, during each half cycle, the full half cycle is applied directly across the unijunction transistor 14 with the power path being unidirectionally directed through the unijunction transistor.

In accordance with the present invention, a resistor 33 is connected between the base 30 of the unijunction transistor 14 and the junction of the resistor 28 and the diode 29 and is thus connected in series with the resistor 32 and in parallel with the interbase circuit of unijunction transistor 14 in series with the primary 23 of the pulsing transformer 13. Resistor 33 functions as a stabilizing resistor. In a unijunction transistor, the interbase resistance is highly sensitive to temperature. In operation, the resistor 33 acts with the resistor 32 to divide the input voltage and maintain a selected percentage across the base electrodes 30 and 31. The resistor 33 is in parallel with the interbase resistance and minimizes the effect of any variation in the base resistance with temperature. Generally, the prior art devices have provided series connected resistors or a paralleled Zener diode to maintain a selected voltage across the unit. Although such modifications did not provide sufficient stability for application of the firing circuit for motor controls, particularly where widely varying temperature conditions are encountered as in the present application, the simple modification and application of the resistor 33 surprisingly provided an exceptionally high degree of stabilization to the point where the circuit has been satisfactorily operated over widely varying temperature ambient temperatures. The resistor 33 in one circuit as shown in the drawing reduces the drift in set point due to a 100° F. variation in unijunction transistor 14 ambient temperature, from 25° F. to only 4° F. change.

The emitter 15 of the unijunction transistor 14 is connected to the trigger branch 16 of the firing circuit 12 which in turn is connected between the junctions of the rectifying branches. Generally, the trigger branch 16 includes the thermistor 18 having one end connected directly to the junction of resistor 27 and diode 26 and the opposite end connected in series with a resistor 34 and the parallel combination of a resistor 35 and a timing capacitor 36 to the junction of resistor 28 and diode 29. The emitter 15 is connected to the junction between the resistor 34 and the paralleled resistor 35 and capacitor 36. In operation, the pulsating voltage applied across the interbase electrode branch 17 of the unijunction transistor 14 is simultaneously applied across the timing or trigger branch 16. An in-phase pulsating voltage is therefore impressed upon both the trigger branch and the base branch. The current in the trigger branch 16 charges the capacitor 36 and impresses an increasing voltage on the emitter 15. The resistance of the thermistor 18 varies with the temperature condition and thus varies the time constant of the circuit including the capacitor 36 and the series connected resistor 34. Consequently, the precise time that the capacitor 36 will charge to the firing point of the unijunction transistor 14 in each half cycle varies with the resistance of the thermistor 18 and therefore the sensed temperature of the condenser. It should be noted that the voltage pulses applied to the emitter 15 and to the main interbase circuit of the unijunction 14 are in phase and further each will vary in the same manner and generally in proportion to changes in line voltage. Thus, if the peak line voltage increases, the peak voltage applied to the emitter 15 and to the base electrode 30–31 varies in the same manner and in proportion. As the applied interbase voltage increases, the firing voltage necessary at the emitter 15 will increase and vice versa with decreasing voltages. It has been found that the present application providing the tracking or pulsating voltages to the unijunction transistor 14 and paralleled stabilizing resistor 33 and to the emitter 15 provide relatively precise tracking between the two circuits such that the firing point for any given temperature is maintained at a corresponding desired firing point within the corresponding half cycle.

A radio frequency choke 37 and a capacitor 38 are connected across the input terminals to the firing circuit 12 and the motor 7 to suppress transient voltages and suppress radio interference. The capacitor 38 functions to further reduce the false firing of the unijunction transistor 14 as a result of any fast rising line transients or interactions with other controls connected to the same supply lines.

The operation of the illustrated embodiment of the invention is summarized as follows.

The circuit is designed to provide a selected variation in the resistance of the thermistor 18 for a corresponding control temperature range which affects the predetermined variation in the speed of the motor. In operation the thermistor 18 may be selected for example to have a set point temperature providing 95 percent full load voltage to the motor 7.

With the thermistor 18 at the set temperature, the resistance of the firing circuit is such that the capacitor 36 will charge to the firing point and fires the unijunction transistor 14 which in turn through the pulse transformer 13 applies a pulse to the gate 11 of the symmetrical triggered switch 8 to apply 95 percent of the line voltage to the motor 7. The circuit will continue to fire at essentially the same angle during each half cycle to maintain application of the corresponding half cycles as long as the thermistor 18 is maintained at that temperature. If the line voltage should increase or decrease, the voltage applied across the unijunction 14 and particularly the base electrode 30–31 as it appears across resistor 36 will correspondingly increase or decrease. However, the voltage applied to the timing branch 16 and thus to the emitter 15 includes a corresponding variation and consequently corresponding tracking of the charging of the capacitor 36 and the generation of the firing voltage at the emitter 15 to maintain the precise firing point. As previously noted, the resistor 33 provides a stable percentage voltage across the base junction of the unijunction transistor 14 and consequently substantially eliminates the effect of ambient temperature on the control. As a result of this structure and arrangement, this circuit is particularly adapted and may be mounted as an integrated part of the end frame of the motor for example as shown and claimed in applicant's previously identified copending application.

If the sensed temperature varies, the negative temperature coefficient thermistor resistance will vary inversely. If the temperature goes up, the resistance of the thermistor 18 in accordance with well known theory goes down. This will reduce the time constant of the timing circuit and consequently, the firing point is reached earlier in the cycle to fire the unijunction transistor 14 and the switch 8 and apply a greater portion of the applied current to the motor 7 and thereby increase the speed of the motor 7. This will increase the cooling effect to return the temperature condition to the desired set point. Conversely, if the temperature goes down, the temperature of the thermistor goes up to increase the time constant, retard the firing point and thereby reduce the proportion of the voltage and current applied to the motor 7. This in turn reduces the speed of the motor to allow the temperature to increase to the set point condition.

The present invention provides an improved motor control network having means to suppress transient and direct current components and means to improve the firing characteristics of a unijunction transistor firing circuit or the like under varying input voltage and operating temperature conditions.

Various modes of carrying out the invention are contemplated as being within the scope of the following claims particularly pointing out and distinctly claiming the subject matter which is regarded as the invention.

I claim:

1. In the combination of an alternating current motor in a series energizing circuit with a triggered rectifier means to conduct both the positive and negative half cycles of the input voltage and a unijunction firing circuit having a pulse transformer connecting the firing circuit and the triggered rectifier, the improvement in the firing circuit comprising
    a unijunction output circuit including a unijunction transistor having an interbase means connected in series between a resistance element and a pulse transformer,
    means to rectify and impress the alternating current upon the unijunction output circuit, and
    a control resistance element connected in parallel across the interbase means of the transistor and in series with the first named resistance element to define a proportional voltage divider.

2. The combination of claim 1 wherein the impedance elements are resistors and the pulse transformer includes a primary winding connected in series with interbase means and the control resistor is connected in parallel with the interbase means and the primary.

3. In a condition responsive motor control for an alternating current motor having the motor winding means serially connected with a triggered symmetrical switch means having a gate control means, the improvement in the firing signal generating means comprising
    a unijunction transistor means having an interbase circuit and an emitter,
    a rectifying circuit connected to the power lines to provide a pulsating voltage between a pair of direct current terminals,
    a main branch circuit connected between said direct current terminals and serially including the interbase circuit of the transistor and a resistance,
    a resistance connected in parallel with said interbase circuit and forming a voltage divider network with said first named resistance element to impress a selected percentage of the pulsating voltage upon the interbase circuit, and
    an emitter control branch circuit serially including a temperature sensitive resistance element and a resistor and a capacitor connected between said direct current terminals and lead means connecting the emitter and the junction of the resistor and the capacitor.

4. The control of claim 3 wherein said rectifying circuit includes a pair of parallel half wave rectifying branch circuits each including a resistor in series with a diode,
    said diodes being oppositely polarized, and said main branch circuit and said control branch circuit being parallel connected between the half wave rectifying branch circuits.

5. In the combination of an alternating current motor in a series energizing circuit to alternating current input leads with a triggered rectifier adapted to conduit during both the positive and negative half cycles of an input voltage and a unijunction firing circuit having a pulse transformer connecting the firing circuit and the triggered rectifier, the improvement in the firing circuit comprising a unijunction output circuit including a unijunction transistor connected in series between a resistance element and the primary winding of the pulse transformer, a resistance element connected in parallel across the transistor and the primary winding and in series with the first named resistance element to define a proportional voltage divider, a unijunction firing circuit including a temperature sensitive resistance element in series with a resistance element and a paralleled resistance element and a capacitor, said firing circuit being parallel connected with the output circuit, lead means connected between the emitter of the unijunction transistor and the one side of the paralleled resistance element and capacitor, and rectifier means to rectify and impress the alternating current upon the output circuit and the unijunction firing circuit.

6. The combination of claim 5 wherein the rectifier means includes parallel branches connected between the input leads, each branch including a resistor in series with a diode and said diodes being oppositely polarized to define a pair of direct current terminals connected to the output circuit and the firing circuit.

References Cited

UNITED STATES PATENTS 3,192,462   6/1965   James _____ 318—345
3,177,418   4/1965   Meng _____ 318—345 XR

OTHER REFERENCES

Application note: Triac Control for AC Power, Howell, General Electric, May 1964.

AC Motor Speed Control, Mungenast & Dowling, Home Appliance Builder, August 1964, pp. 13–15, 38.

ORIS L. RADER, *Primary Examiner.*

G. Z. RUBINSON, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,314                                 September 24, 1968

John T. Maynard

It is certified that error appears in the above identified patent and that said Letters Patent are hereby corrected as shown below:

Column 4, line 20, after "the" insert -- junction of the --
Column 6, line 58, after "resistance" insert -- element --.
Column 7, line 5, "conduit" should read -- conduct --.

Signed and sealed this 3rd day of March 1970.

(SEAL)
Attest:

Edward M. Fletcher, Jr.                            WILLIAM E. SCHUYLER, JR.
Attesting Officer                                           Commissioner of Patents